United States Patent [19]

Miller

[11] Patent Number: 4,938,583

[45] Date of Patent: Jul. 3, 1990

[54] CONTACT LENS AND METHOD OF MAKING SAME

[76] Inventor: Gregory N. Miller, 11 Bernard Ave., Toronto, Ontario, Canada, M5R-1R3

[21] Appl. No.: 403,167

[22] Filed: Sep. 5, 1989

Related U.S. Application Data

[63] Continuation of Ser. No. 296,339, Jan. 9, 1989, abandoned, which is a continuation of Ser. No. 869,728, Jun. 2, 1986, abandoned.

[51] Int. Cl.⁵ .................... G02C 7/04; G02C 7/06; B24B 1/00
[52] U.S. Cl. ..................... 351/161; 351/168; 51/284 R
[58] Field of Search .............. 351/161, 168, 169, 171; 51/284 R–284 E; 350/320

[56] References Cited

U.S. PATENT DOCUMENTS

| | | | |
|---|---|---|---|
| 1,473,360 | 11/1923 | Styll | 51/284 R |
| 2,112,836 | 4/1938 | Evans | 351/169 |
| 3,279,878 | 10/1966 | Long | 351/168 |
| 3,913,274 | 10/1975 | Raiford et al. | 51/284 R |
| 4,202,848 | 5/1980 | Neefe | 51/284 R |
| 4,324,461 | 4/1982 | Salvatori | 351/161 |
| 4,618,229 | 10/1986 | Sacobstein et al. | 351/161 |

Primary Examiner—Eugene R. LaRoche
Assistant Examiner—Ronald M. Kachmarik

[57] ABSTRACT

A bifocal contact lens is made by cutting a first convex surface on the anterior surface of the lens, the first convex surface being a near distance corrective surface and the posterior surface being shaped to the eye, so that substantially the entirety of the anterior surface is formed by the first corrective surface. A second corrective surface is cut after the lens is eccentrically offset from the axis of rotation of the first surface, the second surface being of greater radius then that of the first surface and the two corrective surfaces forming substantially the entirety of the anterior surface of the lens with the lens being devoid of ballasting other than that provided by the eccentric thinning of the lens.

6 Claims, 2 Drawing Sheets

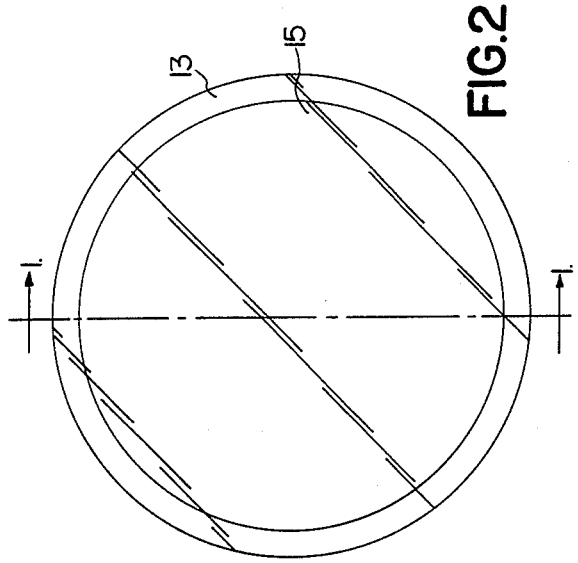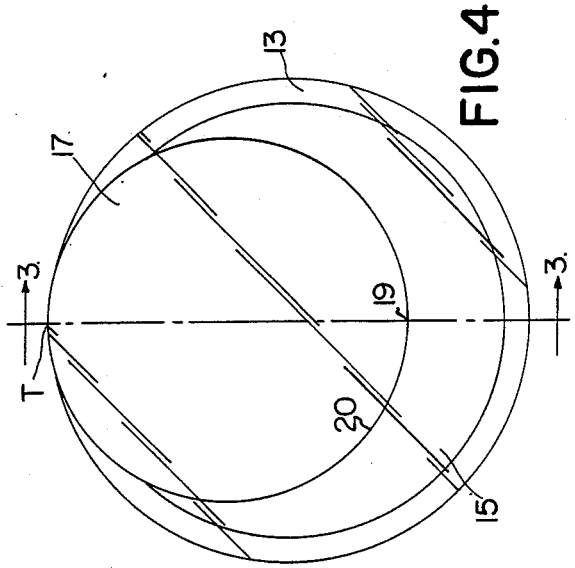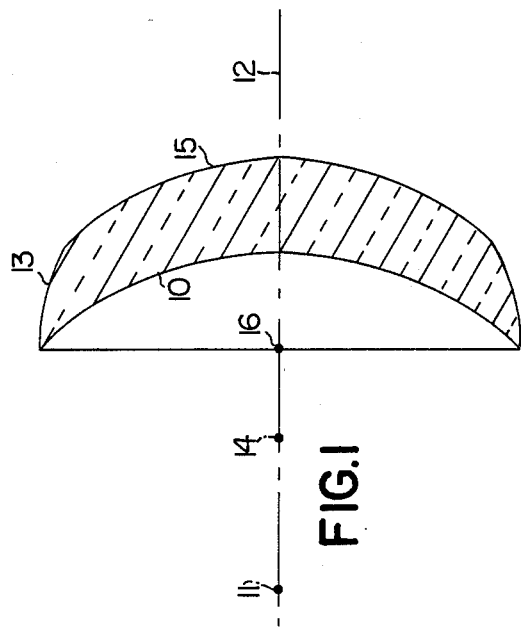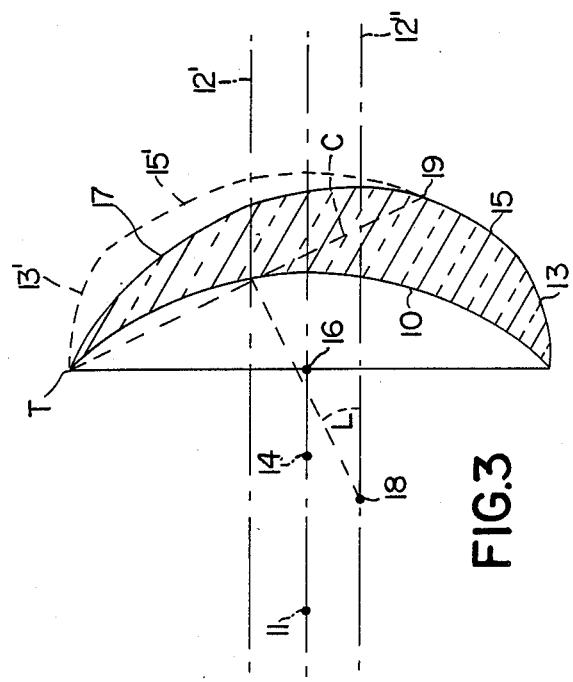

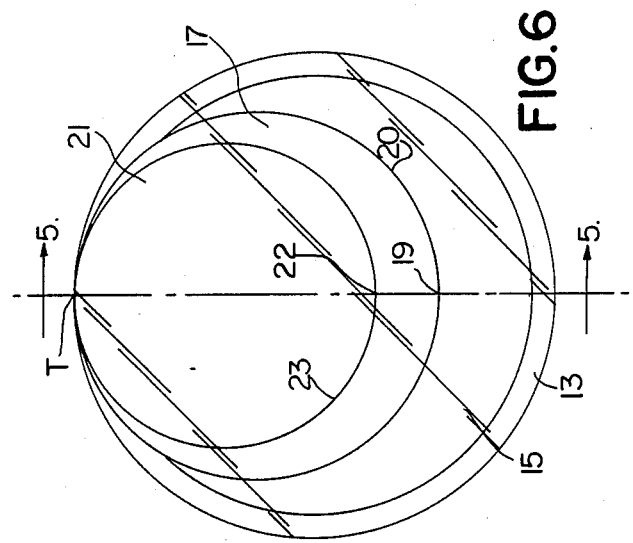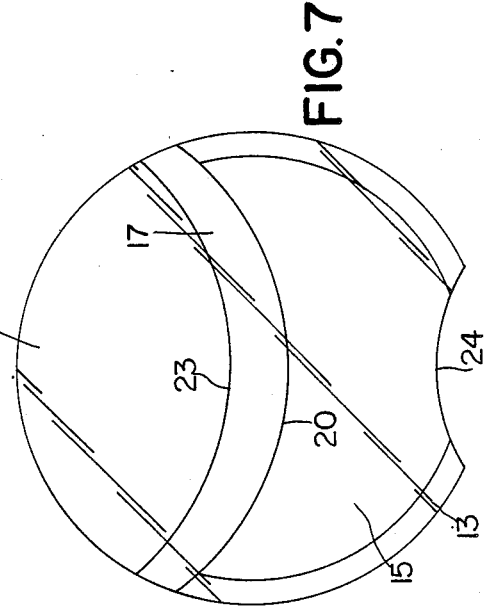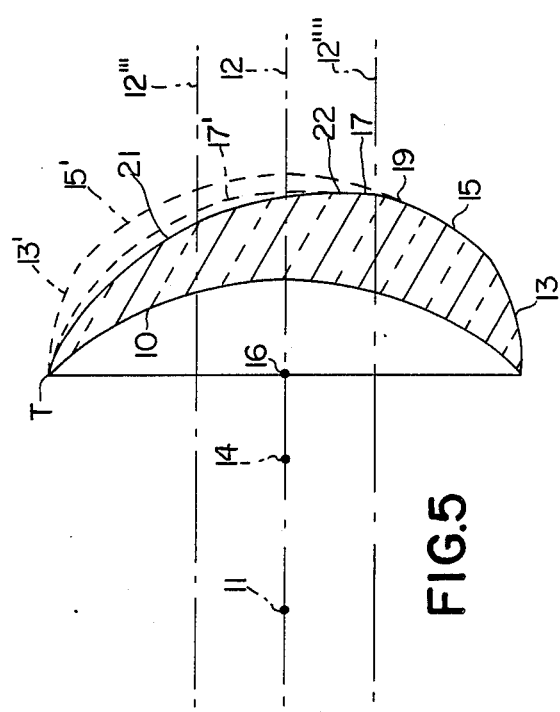

CONTACT LENS AND METHOD OF MAKING SAME

This application is a continuation application of application Ser. No. 296339, filed Jan. 9, 1989, abandoned concurrently herewith, which in turn was a continuation of the original application Ser. No. 869,728 filed 06/0286, abandoned.

BACKGROUND AND BRIEF SUMMARY OF THE INVENTION

This invention relates to the field of contact lenses and the method of making them.

Basically, the invention relates to multisurface contact lenses at least one of whose surfaces is contoured to satisfy a prescription requirement of an individual patient. Whenever multisurface surfaces are provided on a contact lens, some provision must be made to assure that the lens orients itself naturally upon the eye so as to position the lens for natural usage. To specify a particular case, the corrective surface for far distances should be so oriented that it is within the upper portion of the lens, the corrective surface for nearer distance should be so oriented that it occupies a next lower position of the lens, and so on, when the lens is in use on the patient's eye.

The lenses of this invention are characterized in that as a natural consequence of making the lens, it is asymmetrically weighted so that the aforesaid orientation of the various surfaces occurs. It is to be noted that not all of the surfaces need provide optical correction, this being a factor dependent upon the user's requirements.

In a broad aspect, then, the invention relates to contact lenses of the multisurface type in which the lens will naturally orient itself by rotation on the user's eye to position the nearest distance zone of the lens in a lowermost position, the farthest distance zone in an uppermost position and an intermediate distance zone, if any, in a position intermediate these two, all in consequence of the physical characteristics of the lens as obtained from the novel method disclosed herein.

Stated otherwise, an object of the invention involves the method of making a multisurface contact lens in which the lens is asymmetrically weighted so as naturally to position the surfaces in predetermined relation on the user's eye.

Another object of the invention resides in the novel method which comprises the steps of providing a contact lens blank having a posterior surface conforming to the corneal requirements of the user, forming an initial anterior surface on the lens blank in generally centered relation to the optical axis thereof, then forming a second anterior surface on the lens blank centered in offset relation to the initial anterior surface to remove a portion of the initial surface and intersect smoothly therewith to leave a residual portion of the initial surface which defines a zone of the lens providing asymmetrical weighting thereof, at least one of the surfaces being contoured in conformity with a prescription requirement of the user.

Another object of the invention resides in the method as aforesaid wherein the optical axis of the lens, the axis on which the initial surface is centered and the axis on which the second surface is centered all lie substantially in a common plane.

Another object of the invention is to provide a method of making a contact lens having an asymmetrically positioned and weighted presbyopic correction zone so that the presbyopic zone naturally positions itself lowermost in relation to the user's eye, the method involving the steps of providing a contact lens blank having a posterior surface conforming to the corneal requirements of the patient, forming an initial anterior surface on the lens blank corresponding to the required presbyopic correction, and then forming a second anterior surface on the lens blank in offset relation to the initial surface partially to remove the initial surface and intersect smoothly there-with to form the presbyopic correction zone.

Another object of the invention is to provide a method of making a multifocal contact lens which comprises the steps of forming the anterior surface of a contact lens blank with a corrective surface conforming with the nearest distance correction of a user's prescription, and forming a second anterior surface portion of the lens blank with a corrective surface conforming with a greater distance correction of a user's prescription than the aforesaid near distance correction and which smoothly intersects the first formed surface to leave a residual of such first formed surface which is of generally crescent shape.

In conformity with the preceding object, a further object of the invention is to provide a method which includes the step of forming a third anterior surface portion of the lens blank with a corrective surface conforming with far distance correction of the user's prescription which smoothly intersects the second formed surface portion to leave a residual thereof between the first formed surface and the far distance surface.

Another object of the invention is to provide a method of making a multifocal contact lens which comprises providing a contact lens blank having a posterior surface corresponding to the corneal requirements of a patient, forming an initial anterior corrective surface on the lens blank in conformity with a relatively near distance requirement of the patient's prescription and in such relation to the posterior surface as to determine the maximum thickness of the contact lens to be produced, forming a second anterior surface on the lens blank in offset relation to the initial surface in accord with a farther distance requirement of the patient's prescription so as to remove a portion of the initial surface and intersect smoothly therewith to leave a generally crescent-shaped initial zone of relatively near distance correction surmounted by a second zone of the farther distance correction.

Still another object of the invention is to provide a method as above including the further step of forming a third anterior surface on the lens blank in offset relation to the second anterior surface and in accord with the farthest distance correction required by the patient's prescription to intersect smoothly with the second surface and leave a generally crescent-shaped second zone surmounted by a third zone of the farthest distance correction.

It is also an object of this invention to provide novel contact lenses having physical and corrective characteristics as described above.

These and further objects of this invention will become more apparent as this description proceeds with relation to the drawing Figures in which:

BRIEF DESCRIPTION OF THE DRAWING FIGURES

FIG. 1 is a cross-sectional view taken along the plane or section line 1—1 in FIG. 2 and illustrating a lens blank provided with a posterior surface and the initial anterior surface;

FIG. 2 is a plan view of the lens blank as in FIG. 1;

FIG. 3 is a cross-sectional view taken along the plane of section line 3—3 in FIG. 4 and illustrating the provision of a second anterior surface and its smooth intersection with the initial anterior surface;

FIG. 4 is a plan view of the lens of FIG. 3 illustrating the interaction between the initial and second surfaces in producing a crescent shape of the initial zone of the lens;

FIG. 5 is a cross-sectional view taken along the plane or section line 5—5 in FIG. 6 and illustrating a third anterior surface of the lens and its smooth intersection with the second anterior surface;

FIG. 6 is a plan view of the lens according to FIG. 5 illustrating the interaction between the second and third anterior surfaces in producing a generally crescent shape of the zone of the lens defined by the second surface; and FIG. 7 is a view similar to FIG. 6 but illustrating how variations in rotational axis offset in forming the second and/or third anterior surfaces may be used to shape and position the various zones of the lens.

DETAILED DESCRIPTION OF THE INVENTION

With reference at this time to FIGS. 1 and 2, a lens blank is illustrated in which the posterior surface 10 has been configured or contoured in conformity with the corneal requirements of the particular patient for which the lens is being made, this surface being shown for the sake of simplicity as a surface centered at 11 on the optical axis 12 of the lens and about which optical axis the lens is rotated to form the surface 10 as well as the surfaces 13 and 15 about to be described. The anterior surface of the lens is provided with a marginal surface region indicated by the reference character 13, shown as centered at 14 on the optical axis of the lens, and the initial anterior surface which is formed thereon is the surface 15 which, for convenience, is shown as centered at 16 on the optical axis of the lens. At this time, the lens is incomplete and requires further working in order to render it usable. However, FIGS. 1 and 2 illustrate the initial steps which must be taken in order to practice the method of this invention. The various surfaces illustrated may be formed in any conventional fashion such as by lathe cutting them in accord with well known techniques employed for making contact lenses. It is well at this point to note that the lens body may be made from any conventional material usable for contact lenses and the lens made in accord with this invention may be a hard contact lens or it may be a soft contact lens. It also should be mentioned that the various anterior surfaces mentioned herein need not be spherical surfaces as illustrated but may be other and different surfaces in accord with usual techniques. For example, toroidal surfaces for astigmatic correction may be employed where desirable or necessary. Moreover, the anterior surface 15 need not be formed by rotating the lens about the optical axis 12, but may be formed by rotating the lens about an axis offset slightly from the optical axis 12.

The next step in the method of this invention resides in the formation of the second anterior surface on the lens as is illustrated in FIGS. 3 and 4 and it is this step which imparts at least the major asymmetrical weight distribution for the lens so that it may naturally rotate on the patient's eye when in use so as to position the zone of the lens bounded by the margins of the initial surface 15 in a lowermost position on the patient's eye. This second surface is illustrated at 17 in FIG. 3 and its center 18 is located along the line L perpendicular to the midpoint of the chord C which connects the points T and 19, the second anterior surface 17 being formed by rotating the lens about the axis 12″ which is offset from and parallel to the axis 12 and conjugate to the axis 12′, as shown. In FIG. 3, the second anterior surface 17 is shown as spherical, but it need not be as is permitted by currently known cutting techniques. In any event, the cutting is carried out such that the second surface 17 intersects as smoothly as possible with the initial anterior surface 15 and with the marginal surface 13 to provide a reasonably smooth margin 20 as illustrated in FIG. 4 which delineates the upper boundary of the residual, crescent-shaped zone of the initial surface 15 and the lower boundary of the new zone provided by the surface 17 see particularly FIG. 4. The formation of the second anterior surface removes some of the lens material as is most clearly shown in FIG. 3 wherein the lens portion so removed is bounded by the original initial surface portion 15′, the original margin surface 13′ and the second surface 17, the asymmetrical weight distribution being plainly visible from the Figure.

Except for conventional polishing, if desired, to remove the possibility of any disturbing effect to the wearer due to the margin at 20, the lens as so far described may be a finished lens. For example, is the lens surface 15 has been formed in conformity with the near or reading distance prescription requirement of a presbyopic patient and the surface 17 has been formed in conformity with the far distance correction requirements in accord with the patient's prescription, the contact lens so formed constitutes a bifocal contact lens which the patient may use by employing eye movements as are required for ordinary bifocal eyeglasses.

In any case, it is to be noted that the lens as formed in accord with FIGS. 1–4 has, upon the formation of the initial lens surface 15, determined the maximum thickness of the finished lens and has, upon the formation of the second surface 17, determined at least the major asymmetrical weight distribution for the lens.

FIGS. 5 and 6 illustrate the formation of a trifocal contact lens. As illustrated, the secondary surface 17 is formed in accord with an intermediate distance correction required by, the patient's prescription by rotation of the lens about the offset axis 12″ as noted above, and a third anterior surface 21 is formed in conformity with the far distance correction required by the patient's prescription, but by rotation of the lens about the axis 12″″. The center of curvature of the tertiary surface 21 is located along a line perpendicular to the midpoint of a chord connecting the points 22 and T. As was the case for the intersection between the initial and second surfaces along the margin or boundary 20, the tertiary surface 21 intersects smoothly with the second surface 17 as shown at the point 22 in FIG. 5 and creates a margin 23 as illustrated in FIG. 6 which delineates the upper boundary of the residual, generally crescent-shaped intermediate distance zone 17. Because the axes of rotation 12″ and 12″″ forming the second and third surfaces 17 and 21 lie in a common plane also containing the optical axis 12 of the lens, the two residual crescent-shaped zones defined by the surfaces 15 and 17 and the generally circular zone defined by the surface 21 are symmetrical with a vertical plane through the lens and containing the optical axis thereof when in use on the user's eye. This left/right symmetry is considered desirable in the contact lenses of this invention.

Lenses in accord with this invention are multisurfaced and multi-focal. The necessary and sufficient condition is that the second anterior surface formed is offset in relation to the initial anterior surface of the lens so as to impart the asymmetric weight distribution noted above. It should also be noted that the formation of the third anterior surface imparts an even greater degree of weight asymmetry as is evident from FIG. 5 wherein it will be seen that some of the lens material is removed between the extension of the secondary surface 17' and the third surface 21.

It is also within the realm of this invention that the initial surface 15 formed on the anterior surface of the lens be centered in offset relation to the optical axis which, in and of itself, will lend some degree of weight asymmetry ab initial. The secondary surface and the third surface, if any, will of course emphasize this weight asymmetry.

Any lens material may be used as it becomes available and techniques for forming contact lenses are likewise usable. Currently, the rapid advancement in the composition and variety of optical materials offered for the fabrication of contact lenses has been followed by technological advances in the equipment used in the production of contact lenses. Micro-processor and computer controlled lathes have found their place in high tech production methods of contact lenses along with laser technology for precise control and reproducibility of the lenses. These developments permit the variations as are suggested in FIG. 7 easily to be utilized. This Figure illustrates that variations in decentering may be employed to control the positioning and/or sizes of the various zones of the lenses. Also, it is possible to truncate the lowermost edge of the lens as indicated at 24 to afford a degree of relief with respect to the lower eyelid of the user, which may be desirable for reading.

Lenses formed by the method described above are produced to fit like any other well fitting contact lenses. The reading part of the final lens is chosen to provide the reading prescription needed for an individual wearer for whom the lenses are being made. The lens body may be made in virtually any prescription power needed and from any material. If an intermediate prescription is needed, the correct curve is next cut into the lens body and prior to the final cut which provides the far distance correction. After all prescription powers are provided, the lens is then polished if needed to provide wearable lenses. This polishing partly or completely obliterates the divisions between the different power zones which provide the multifocal effect. The diameter of the lens as well as the secondary curve height and the diameter of the distance power will vary with the height of the bifocal segment and the intermediate distance segment if used. These zones are all variable to accommodate the various segment or zone heights needed to accommodate each patient's eyes. These zone heights vary with the distance from the lower edge of the pupil to the top edge of the lower lid of the eye. The height or size of these zones is controlled by the amounts of decentration of the curves of the various surfaces. As noted, the lens can be further adjusted by truncation of the lowermost edge of the lens if the reading and/or the intermediate zones need to be lowered.

Having described my invention, it is to be understood that it is not to be limited by the precise terminology and language employed either above or in the following claims, but in accord with the spirit and intent of the coverage intended by the claims herein.

What is claimed is:

1. The method of making a bifocal contact lens usable by presbyopic patients which comprises the steps of:
   a. providing a lens blank having a concave posterior surface shaped in conformity with a patient's cornea to define an optical axis;
   b. rotating the lens blank about an axis of rotation substantially coincidental with the optical axis as defined by the posterior surface;
   c. cutting a convex first corrective surface on the anterior surface of the lens blank while the lens blank is being rotated about the axis of rotation and until the first corrective surface forms substantially the entirety of the anterior surface, the first corrective surface providing a power for the lens conforming with the nearest distance correction of the patient's prescription and being centered on the axis of rotation;
   d. shifting the lens blank perpendicularly to the axis of rotation to offset the lens blank parallel to the axis of rotation and to define a second axis of rotation; and
   e. rotating the offset lens blank about said second axis of rotation and cutting a convex second corrective surface on the anterior surface of the offset lens blank to thin the lens eccentrically by removing some of the first corrective surface while leaving a first corrective surface which is of crescent shape, the second corrective surface being of greater radius than the first corrective surface to form therewith substantially the entirety of the anterior surface of the lens, the lens being devoid of ballasting other than that provided by the eccentric thinning of the lens.

2. A contact lens made according to the method defined in claim 1.

3. A soft contact lens made according to the method defined in claim 1.

4. The method of making a multifocal contact lens which comprises the steps of:
   a. providing a lens blank having a concave posterior surface shaped in conformity with a patient's cornea to define an optical axis;
   b. rotating the lens blank about an axis of rotation substantially coincidental with the optical axis as defined by the posterior surface;
   c. cutting a convex first corrective anterior surface concentrically on the lens blank while the lens blank is being rotated about the axis of rotation to establish a lens whose anterior surface is at least substantially completely defined by the first corrective surface providing a power for the lens conforming with the nearest distance correction of the patient's prescription;
   d. determining a chord of the first corrective surface which extends from a point on the first corrective surface adjacent the optical axis of the lens to a point on the first corrective surface substantially at the margin thereof, the chord defining a line which is contained within a plane also containing the optical axis;

e. cutting a second corrective surface on the anterior surface of the lens by rotating the lens accentrically with respect to the first corrective surface, centered along a line which is normal to and bisects the chord, having a radius which is greater than that of the first corrective surface so as eccentrically to thin the lens by removing a portion of the first corrective surface and also defining the chord between the points so that the second corrective surface is of circular shape and blends with the first corrective surface to leave it of crescent shape whereby the lens is naturally ballasted by the eccentric thinning thereof.

5. A contact lens made according to the method defined in claim 4.

6. A soft contact lens made according to the method defined in claim 4.